US007848483B2

(12) United States Patent
Platonov et al.

(10) Patent No.: US 7,848,483 B2
(45) Date of Patent: Dec. 7, 2010

(54) MAGNESIUM SILICIDE-BASED MULTILAYER X-RAY FLUORESCENCE ANALYZERS

(75) Inventors: Yuriy Y. Platonov, Troy, MI (US); Kazuaki Shimizu, Osaka (JP)

(73) Assignees: Rigaku Innovative Technologies, Auburn Hills, MI (US); Rigaku Industrial Corporation, Osaka (JP)

( * ) Notice: Subject to any disclaimer, the term of this patent is extended or adjusted under 35 U.S.C. 154(b) by 171 days.

(21) Appl. No.: 12/186,297

(22) Filed: Aug. 5, 2008

(65) Prior Publication Data

US 2009/0225937 A1    Sep. 10, 2009

Related U.S. Application Data

(60) Provisional application No. 61/034,552, filed on Mar. 7, 2008.

(51) Int. Cl.
*G01N 23/223* (2006.01)
*G21K 1/06* (2006.01)
(52) U.S. Cl. .............................. 378/49; 378/44; 378/45; 378/84
(58) Field of Classification Search .................. 378/44, 378/45, 46, 48, 49, 84, 85
See application file for complete search history.

(56) References Cited

U.S. PATENT DOCUMENTS

| 4,271,353 | A | 6/1981 | Ohtsuki et al. |
| 4,675,889 | A | 6/1987 | Wood et al. |
| 4,693,933 | A | 9/1987 | Keem et al. |
| 4,727,000 | A | 2/1988 | Ovshinsky et al. |
| 4,785,470 | A | 11/1988 | Wood et al. |
| 5,082,621 | A | 1/1992 | Wood |
| 5,167,912 | A | 12/1992 | Wood |
| 5,216,539 | A | * | 6/1993 | Boher et al. ................. 359/359 |
| 5,384,817 | A | 1/1995 | Crowther et al. |

(Continued)

OTHER PUBLICATIONS

P. Boher et al., "Magnesium silicide based multilayers for soft X-ray optics," SPIE vol. 1546 Multilayer and Grazing Incidence X-Ray/EUV Optics (1991), p. 502-519.*

(Continued)

*Primary Examiner*—Allen C. Ho
(74) *Attorney, Agent, or Firm*—Brinks Hofer Gilson & Lione

(57) ABSTRACT

The present invention provides a multilayer structure including a substrate having formed on a surface thereof at least one period of individual layers, the period having at least two layers including a first layer which includes magnesium silicide and a second layer which includes at least one of tungsten, tantalum, cobalt, nickel, copper, iron, chromium, alloys, oxides, borides, silicides, and nitrides of these elements, silicon, carbon, silicon carbide, boron, and boron carbide. If the period includes three layers, the second layer includes one of silicon, carbon, silicon carbide, boron, and boron carbide and a third layer includes one of tungsten, tantalum, cobalt, nickel, copper, iron, chromium, and alloys, oxides, borides, silicides, and nitrides of these elements, the second layer being disposed between the first and the third layers. If the period includes four layers, a fourth layer includes one of silicon, carbon, silicon carbide, boron, and boron carbide, the third layer being disposed between the second and fourth layers, and the fourth layer being disposed between the third layer of multilayer period n and the first layer of multilayer period n−1.

26 Claims, 6 Drawing Sheets

U.S. PATENT DOCUMENTS

| | | | |
|---|---|---|---|
| 5,646,976 A | 7/1997 | Gutman | |
| 5,757,882 A | 5/1998 | Gutman | |
| 5,958,605 A * | 9/1999 | Montcalm et al. | 428/627 |
| 6,014,423 A | 1/2000 | Gutman et al. | |
| 6,041,099 A | 3/2000 | Gutman et al. | |
| 6,069,934 A | 5/2000 | Verman et al. | |
| 6,295,164 B1 * | 9/2001 | Murakami et al. | 359/584 |
| 6,330,301 B1 | 12/2001 | Jiang | |
| 6,333,967 B1 | 12/2001 | Osaka et al. | |
| 6,389,100 B1 | 5/2002 | Verman et al. | |
| 6,396,900 B1 * | 5/2002 | Barbee et al. | 378/84 |
| 6,404,847 B1 | 6/2002 | Ueki et al. | |
| 6,421,417 B1 | 7/2002 | Jiang et al. | |
| 6,441,963 B2 * | 8/2002 | Murakami et al. | 359/584 |
| 6,504,902 B2 | 1/2003 | Iwasaki et al. | |
| 6,510,200 B1 | 1/2003 | Martynov et al. | |
| 6,570,390 B2 | 5/2003 | Hirayama et al. | |
| 6,643,353 B2 | 11/2003 | Verman et al. | |
| 6,763,086 B2 | 7/2004 | Platonov | |
| 6,791,335 B2 | 9/2004 | Hirayama et al. | |
| 6,807,251 B2 | 10/2004 | Okanda et al. | |
| 6,809,864 B2 | 10/2004 | Martynov et al. | |
| 6,870,896 B2 | 3/2005 | Protopopov | |
| 6,873,681 B2 | 3/2005 | Toraya et al. | |
| 6,917,667 B2 | 7/2005 | Fujinawa et al. | |
| 6,920,199 B2 * | 7/2005 | Michaelsen | 378/84 |
| 6,920,200 B2 | 7/2005 | Ito et al. | |
| 6,937,695 B2 | 8/2005 | Hoshino | |
| 6,944,270 B1 | 9/2005 | Kim | |
| 6,970,532 B2 | 11/2005 | Hayashi et al. | |
| 6,990,177 B2 | 1/2006 | Fujinawa et al. | |
| 6,993,113 B2 | 1/2006 | Hoshino et al. | |
| 7,035,373 B2 | 4/2006 | Omote | |
| 7,039,161 B2 | 5/2006 | Ito et al. | |
| 7,076,026 B2 | 7/2006 | Verman et al. | |
| 7,116,755 B2 | 10/2006 | Omote | |
| 7,130,373 B2 | 10/2006 | Omote et al. | |
| 7,139,366 B1 | 11/2006 | Jiang | |
| 7,221,734 B2 | 5/2007 | Omote | |
| 7,245,699 B2 | 7/2007 | Verman et al. | |
| 7,248,669 B2 | 7/2007 | Ito et al. | |
| 7,257,192 B2 | 8/2007 | Omote | |
| 7,258,485 B2 | 8/2007 | Nakano et al. | |
| 7,272,206 B2 | 9/2007 | Ito | |
| 7,280,634 B2 | 10/2007 | Verman et al. | |
| 7,286,637 B2 * | 10/2007 | Imai et al. | 378/84 |
| 7,333,592 B2 | 2/2008 | Nonoguchi et al. | |
| 7,342,997 B2 | 3/2008 | Ueda et al. | |
| 7,356,114 B2 | 4/2008 | Kataoka et al. | |
| 7,400,705 B2 | 7/2008 | Hoshino et al. | |
| 7,474,734 B2 | 1/2009 | Ito | |

OTHER PUBLICATIONS

Takenori Toyota et al., "Performance of newly developed Mg/SiC multilayer mirrors," SPIE vol. 6705 Advances in X-Ray/EUV Optics and Components II (2007), p. 67050V-1.*

Yuriy Y. Platonov et al., "Deposition of X-Ray Multilayers on Long Size Substrates for Synchrotron Applications," SPIE vol. 3152 Materials, Manufacturing, and Measurement for Synchrotron Radiation Mirrors (1997), pp. 231-239.*

Publication—Japanese Journal of Applied Physics, vol. 40 (2001) pp. 376-379, by Takeo Ejima et al., entitled "Two-Color Reflection Multilayers for He-I and He-II Resonance Lines for Microscopic Ultraviolet Photoelectron Spectroscopy Using Schwarzschild Objective".

Boher P. et al, "Tungsten/Magnesium Silicide Multilayers for Soft X-Ray Optics", Journal of X-Ray Science and Technology, vol. 3, 1992, pp. 118-132.

International Search Report dated Aug. 7, 2009—corresponding to co-pending application No. PCT/US2009/036036.

* cited by examiner

MAGNESIUM SILICIDE-BASED MULTILAYER X-RAY FLUORESCENCE ANALYZERS

CROSS-REFERENCE TO RELATED APPLICATIONS

This application claims priority to U.S. Provisional Application No. 61/034,552, filed Mar. 7, 2008, entitled "Magnesium-Based Multilayer X-ray Fluorescence Analyzers."

BACKGROUND

1. Field of the Invention

The present invention generally relates to a multilayer structure for reflecting x-ray radiation and an associated method for analyzing the atomic or molecular composition of a sample through x-ray fluorescence spectroscopy.

2. Description of Related Art

Multilayer reflectors, or Bragg reflectors, operating with x-ray radiation, are often utilized for analyzing structures and detecting the absence or presence of particular atomic elements or molecules. One such procedure is generally known as x-ray fluorescence spectroscopy (XRF). Such a procedure is useful in detecting impurities of minimal amounts present in the sample of interest. For example, XRF is used in the semiconductor industry for detecting impurities in the silicon and germanium wafers that are the foundation of highly-integrated circuits. Two types of XRF systems are commonly used. In energy dispersive spectroscopy (EDS), a detector receives a broad range of energy from the sample and the detector asked to discriminate based on the wavelengths of interest. In wavelength dispersive spectroscopy (WDS), a collection optic acts as a filter to relay to the detector only a wavelength of interest. Each approach has its advantages and disadvantages. For example, EDS systems can detect wavelengths over a large range but have sensitivity limitations. WDS systems have high energy resolution and sensitivity but are designed for detecting only wavelengths of specific elements of interest.

In a typical XRF/WDS procedure, an x-ray radiation field is guided to a sample, such as a silicon wafer. The impinging radiation induces a fluorescent radiation field, which is incident upon a multilayer or Bragg reflector. The fluorescent radiation field is directed by the multilayer to a measuring or analyzing detector.

In a WDS system, the multilayer functions both as a reflective optic and a frequency selector because the multilayer is designed and oriented in a system such that fluorescent radiation that satisfies Bragg's equation is reflected. Bragg's equation in general is:

$$n\lambda = 2d \sin \theta, \quad (1)$$

where n is an integral number, $\lambda$ is the wavelength of the initial x-ray radiation field, d is the periodicity of the lattice structure of the multilayer, and $2\theta$ is the angle of diffraction.

Bragg's equation is satisfied for certain types of natural crystals that have regular lattice structures. However, typical crystals have spacings of a few tenths of a nanometer, and because soft x-rays have wavelengths between 1-10 nanometers, Equation (1) is not satisfied for such wavelengths. Consequently, for soft x-ray analyses using Bragg-type reflections, a multilayer or "synthetic crystal" reflector is necessary.

A typical multilayer consists of a substrate upon which layers of two or more different materials are sequentially deposited, forming a period of layers of thickness d. Generally, one of the materials has a high dielectric constant and the other has a low dielectric constant. Upon impinging at that interface between the dielectric constants, approximately $10^{-2}$ to $10^{-3}$ of the incident radiation is reflected at each period of the layers. Therefore, a multilayer structure having 10 to $10^3$ layers would theoretically reflect nearly all of the incident radiation. Multilayers have the added advantage of customization, meaning that the d-spacing can be tailored to meet Bragg's equation for different wavelengths of interest.

Traditionally, multilayer XRF analyzers have been utilized in the analysis of various elements from magnesium (Mg) to beryllium (Be). For example, in the semiconductor industry, semiconductor material substrates are now being fabricated with multiple thin film layers. Multilayers can be used to characterize samples having multiple thin film layers formed thereon. Each film layer can be formed from a different material. A wide variety of material combinations having a d-spacing ranging from 1.5 nm to 10 nm are currently in use. For the analysis of a particular element, one can find an optimal structure for the best available performance, but there is always a demand for improvements. For example, a common multilayer consisting of tungsten-silicide (W/Si) periods has been used to analyze films containing various elements such as magnesium (Mg), sodium (Na), fluorine (F), and oxygen (O). Such analyzers are relatively efficient in the analysis of magnesium (Mg) and sodium (Na), but their performance in analyzing fluorine (F) and oxygen (O) is less efficient. By developing a deposition technology one can minimize imperfections of the W/Si multilayer structures such as interlayer diffusion, roughness and others, but a gain in performance is expected to be minor because of a fundamental limit arising from the optical constants of tungsten (W) and silicon (Si) materials. Therefore, there is a need for an improved multilayer analyzer for analyzing thin film layers containing various elements, and, in particular, for analyzing elements such as fluorine (F) and oxygen (O).

Examples of thin film layer materials commonly fabricated on semiconductor substrates further include oxides, nitrides, titanium (Ti) and titanium-nitride (TiN). Current analysis of TiN thin films, for example, uses two analyzers: a multilayer, such as a scandium (Sc)-based multilayer, for analyzing nitrogen (N); and a crystal, such as lithium fluoride (LiF), for analyzing titanium (Ti). Using a Sc-based multilayer for analyzing N results in significant reflectivity. This latent reflectivity increases the background signal in certain silicon-containing samples, such as silicon wafers. Further, the Sc-based multilayer is only capable of analyzing the N in TiN thin film coated samples, thus requiring the second analyzer (LiF crystal) for analyzing the Ti. Even when N is the only analyzed element, both analyzers have to be used due to the presence of the Ti-$L_l$ line, which is in close vicinity to the N—$K_\alpha$ line. This requires a two-channel device for housing two separate analyzers which is expensive and inconvenient. Therefore, there is a need for a single analyzer for WDS for analyzing samples fabricated with TiN thin films.

Currently, pure magnesium (Mg)-based structures, such as silicon carbide/magnesium (SiC/Mg) multilayer structures, are used for applications at energies below 50 eV. With such low energies, these structures have d-spacings larger than 15 nm. However, for XRF analysis of light elements from magnesium (Mg) to nitrogen (N), multilayer analyzers with d-spacings of between about 2 and 4 nm are optimal. Multilayer structures containing pure Mg layers, such as tungsten/magnesium (W/Mg) with a d-spacing of about 4 nm and smaller, are not desirable due to the strong intermixing/reaction of these materials which results in a very poor x-ray performance.

Thus, there is a need for improving the quality of existing analyzers, or for lowering the number of analyzers in a WDS spectrometer without narrowing the number of analyzed elements and losing too much in performance.

Further, there is a need for an improved multilayer analyzer which has the capability to optimize parameters, such as reflectivity and selectivity, as well as reduce undesirable background signals, depending upon the particular application and the elements under analysis.

SUMMARY OF THE INVENTION

In satisfying the above need, as well as overcoming the enumerated drawbacks and other limitations of the related art, at least one embodiment of the present invention provides a multilayer structure which performs in a wide spectral range, and is superior in performance in comparison with existing analyzers. The multilayer structure is magnesium silicide ($Mg_2Si$)-based and may contain two, three, four or more layers in a period.

In a first embodiment of the present invention, a multilayer structure for reflecting x-rays includes a substrate and at least one pair of layers formed on a surface of the substrate. The pair of layers includes a first layer and a second layer. The first layer includes magnesium silicide ($Mg_2Si$). The second layer includes at least one of tungsten (W), tantalum (Ta), cobalt (Co), nickel (Ni), copper (Cu), iron (Fe), chromium (Cr), alloys, oxides, borides, silicides, and nitrides of these elements, silicon (Si), carbon (C), silicon carbide (SiC), boron (B), boron carbide ($B_4C$), and any other metal or light element known in the art having suitable optical properties. In this embodiment, the first layer is the top layer (i.e., the layer within the pair of layers first exposed to radiation) and the second layer is the bottom layer (i.e., the layer within the pair of layers last exposed to radiation).

In a second embodiment of the present invention, a multilayer structure for reflecting x-rays includes a substrate and at least one triad of layers formed on a surface of the substrate. The triad of layers includes a first layer, a second layer, and a third layer. The first layer includes magnesium silicide ($Mg_2Si$). The second layer includes at least one of silicon (Si), carbon (C), silicon carbide (SiC), boron (B), boron carbide ($B_4C$), or any other light element known in the art having suitable optical properties. The third layer includes at least one of tungsten (W), tantalum (Ta), cobalt (Co), nickel (Ni), copper (Cu), iron (Fe), chromium (Cr), and alloys, oxides, borides, silicides, and nitrides of these elements, and any other metal known in the art having suitable optical properties. In this embodiment, the first layer is the top layer (i.e., the layer within the triad of layers first exposed to radiation) and the third layer is the bottom layer (i.e., the layer within the triad of layers last exposed to radiation). The multilayer structure may further include a fourth layer, thus forming a quartet of layers formed on the surface of the substrate, wherein the fourth layer includes one of the materials listed above with respect to the second layer, and wherein the fourth layer is the bottom layer (i.e., the layer within the quartet of layers last exposed to radiation).

In this embodiment, a third, and possibly fourth or more, layer provides the multilayer structure with improved performance and the flexibility to smoothly tune characteristics of an analyzer such as reflectivity, selectivity, and peak-to-background ratio by changing the relative thicknesses of the layers. The variation in the materials and thickness of the layers of the multilayer structure provides a way to optimize analyzer performance in accordance with a particular application, as opposed to prior art multilayer structures having three or more layers, wherein the third layer merely serves as a barrier layer to provide structural integrity to the structure.

In a third embodiment of the present invention, an x-ray fluorescence spectroscopy system includes an x-ray source emitting an x-ray radiation field on a sample and a multilayer structure which includes a substrate and at least one period of individual layers formed on a surface of the substrate. The number of individual layers in the period is at least three, wherein the layers are formed from the materials described above. The sample emits a fluorescent radiation field in response to the x-ray radiation field, and the multilayer structure selectively reflects the fluorescent radiation field.

In another embodiment of the present invention, a method of x-ray fluorescence spectroscopy includes providing a field of x-ray radiation and irradiating a sample to be analyzed with the field of x-ray radiation, thereby inducing a field of fluorescence radiation. The method further includes directing the field of fluorescence radiation from a multilayer reflector which includes a substrate and at least one period of individual layers formed on a surface of the substrate. The number of individual layers in the period at least three, wherein the layers are formed from the materials described above. The field of fluorescence is then analyzed by a detector after it has radiated the sample.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 6b is an expanded view of the plot depicted in FIG. 6a;

DETAILED DESCRIPTION

Figure 1:
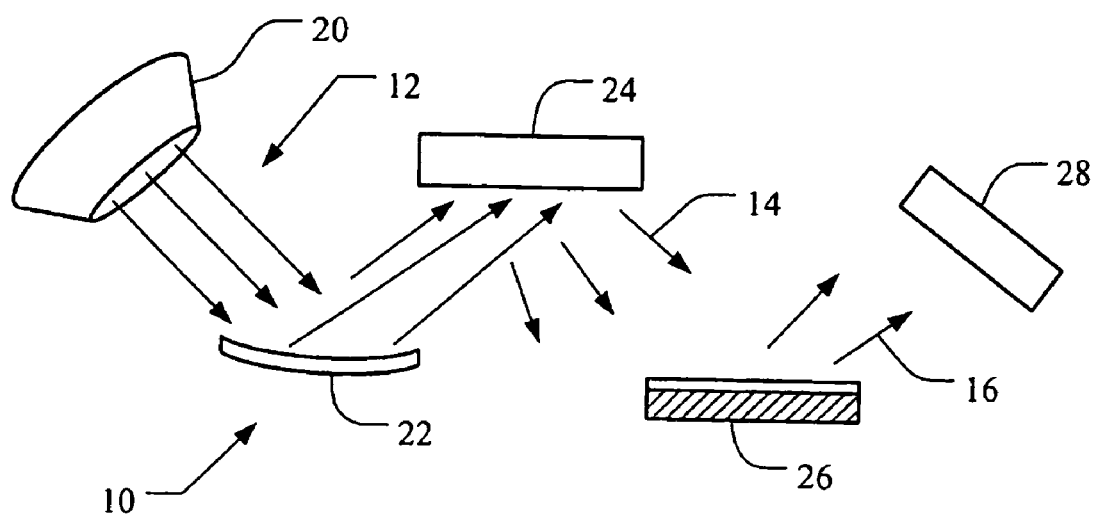
FIG. 1 is a schematic diagram of an embodiment of an x-ray fluorescence spectroscopy apparatus in accordance with an embodiment of the present invention.

In accordance with a preferred embodiment of the present invention, FIG. 1 depicts a system 10 for the x-ray fluorescence analysis of a sample of interest using wavelength dispersive spectroscopy. An x-ray source 20 emits a field of x-ray radiation 12 directed at a reflective optic 22 which can take various forms, including a multilayer Bragg structure. The reflective optic 22 may be used for collimating or monochromatizing the x-ray radiation 12. Alternatively, the system 10 may operate without the reflective optic 22.

As shown, however, the field of x-ray radiation 12 impinges upon a sample of interest 24, such as a silicon wafer that needs to be analyzed to determine chemical impurities. Due to a known physical reaction between the field of x-ray radiation 12 and the sample 24, a field of fluorescent radiation 14 is emitted from the sample. The field of fluorescent radiation 14 contains information in the form of radiation emission lines characteristic of the type of atomic or molecular elements present in the sample 24. The field of fluorescent radiation 14 is selectively reflected from the multilayer structure 26 of the present invention, creating a reflected fluorescent radiation field 16. The reflected fluorescent radiation field 16 is subsequently received and analyzed by a detector 28 that is adapted to interpret qualitative and quantitative aspects of the reflected fluorescent radiation field 16.

Figure 2:
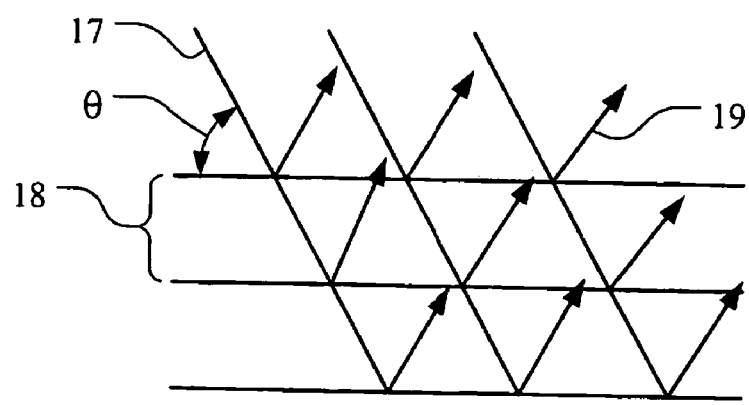
FIG. 2 is a schematic diagram showing the reflection of x-ray radiation from a material satisfying Bragg's equation.

Radiation is selectively reflected from the multilayer structure 26 in accordance with Bragg's equation, Equation 1 above, where a distance, or d-spacing, d is schematically referred to in FIG. 2 as reference numeral 18. As shown in FIG. 2, the incident radiation 17 (analogous to the incident radiation 14 in FIG. 1) that impinges upon a surface at an angle $\theta$ is reflected at intervals that correspond to the d-spacing 18. Constructive interference between a predetermined number of layers creates a uniform field of reflected radiation 19 (analogous to the reflected radiation 16 in FIG. 1).

Figure 3:
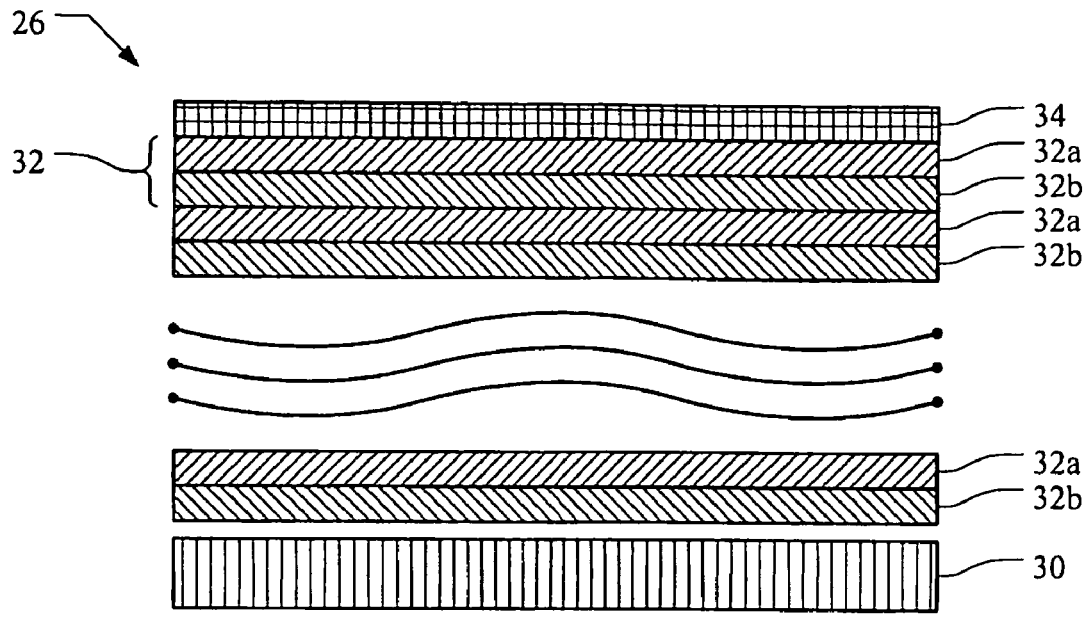
FIG. 3 is a schematic cross-sectional view of a multilayer structure in accordance with an embodiment of the present invention having a series of two individual layers.

FIG. 3 depicts a multilayer structure 26 in accordance with one embodiment of the present invention. The multilayer structure 26 generally includes a substrate 30, upon which a series of pairs or bi-layers 32, may be periodically formed. As shown in FIG. 3, each bi-layer 32 includes a pair of individual layers 32a, 32b, which are sequentially deposited upon the substrate 30 to create the necessary periodicity. The multilayer structure 26 is preferably composed of between around 10 and around 300 bi-layers 32, or between around 20 and around 600 individual layers 32a, 32b. In a preferred embodiment, the multilayer structure 26 is composed of between around 50 and around 150 bi-layers 32, and each by-layer 32 is between around 1 and around 60 nm in thickness, preferably between around 1.5 and around 10 nm in thickness. This thickness is otherwise referred to as the d-spacing of the multilayer structure 26 (as used in Equation (1)).

As noted, each bi-layer 32 is composed of a pair of individual layers 32a, 32b including a first layer 32a and a second layer 32b. In this embodiment, the first layer 32a is composed of magnesium silicide ($Mg_2Si$) and the second layer 32b is composed of at least one of tungsten (W), tantalum (Ta), cobalt (Co), nickel (Ni), copper (Cu), iron (Fe), chromium (Cr), and alloys, oxides, borides, silicides, and nitrides of these elements, silicon (Si), carbon (C), silicon carbide (SiC), boron (B), boron carbide ($B_4C$), and any other metal or light element known in the art having suitable optical properties. Referring to FIG. 3, the first layer 32a is the top layer (i.e., the layer within the pair of layers 32 first exposed to incident radiation) and the second layer 32b is the bottom layer (i.e., the layer within the pair of layers 32 last exposed to incident radiation).

Figure 4:
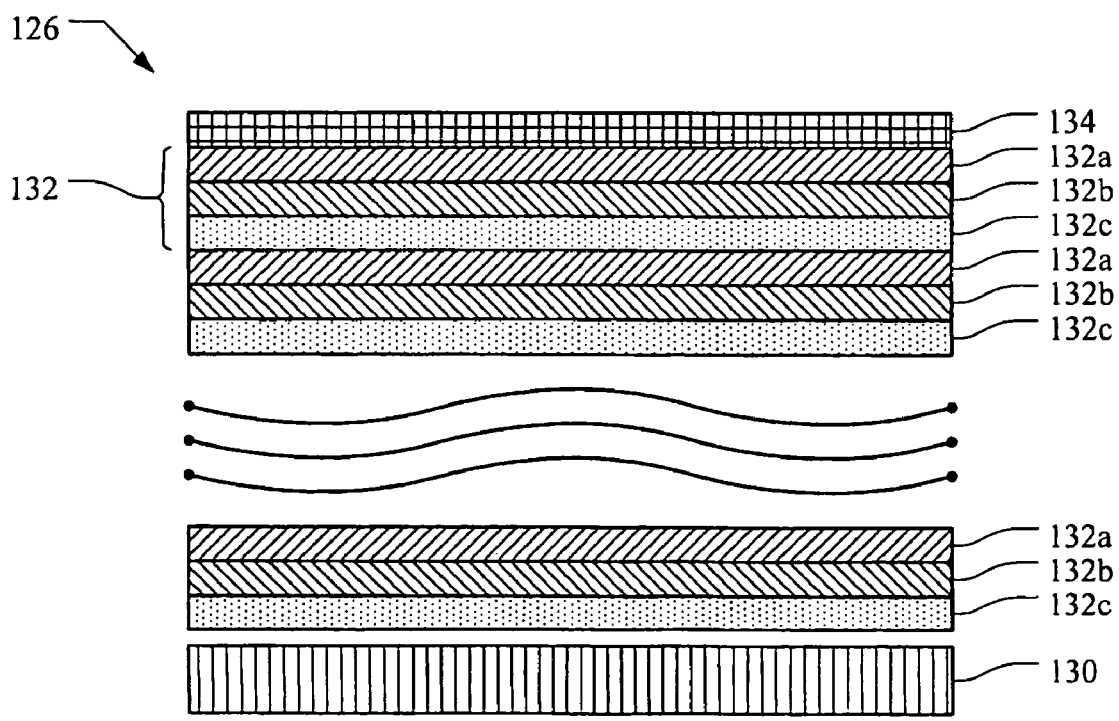
FIG. 4 is a schematic cross-sectional view of a multilayer structure in accordance with an embodiment of the present invention having a series of three individual layers.

Referring to FIG. 4, a multilayer structure 126 in accordance with another preferred embodiment of the present invention is illustrated. The multilayer structure 126 generally includes a substrate 130, upon which a series of triadic layers 132 may be periodically formed. In this embodiment, each triadic layer 132 includes a triad of layers 132a, 132b, 132c, which are sequentially deposited upon the substrate 130 to create the necessary periodicity. The multilayer structure 126 is composed of between around 10 and around 300 triadic layers 132, or between around 30 and around 900 individual layers 132a, 132b, 132c. In a preferred embodiment, the multilayer structure 126 is composed of between around 50 and around 150 triadic layers 132, and each triadic layer 132 is between around 1 and around 60 nm in thickness, preferably between around 1.5 and around 10 nm in thickness. This thickness is otherwise referred to as the d-spacing of the multilayer structure 126 (as used in Equation (1)).

As noted, each triadic layer 132 is composed of a triad of layers 132a, 132b, 132c including a first layer 132a, a second layer 132b, and a third layer 132c. In this embodiment, the first layer 132a is composed of magnesium silicide ($Mg_2Si$). The second layer 132b is composed of at least one of silicon (Si), carbon (C), silicon carbide (SiC), boron (B), boron carbide ($B_4C$), and any other light element known in the art having suitable optical properties. The third layer 132c is composed of at least one of tungsten (W), tantalum (Ta), cobalt (Co), nickel (Ni), copper (Cu), iron (Fe), chromium (Cr), and alloys, oxides, borides, silicides, and nitrides of these elements, and any other metal known in the art having suitable optical properties. As depicted in FIG. 4, the second layer 132b is preferably disposed between the first layer 132a and the third layer 132c. In this embodiment, the first layer 132a includes lighter materials and is therefore the top layer within each triadic layer 132 as shown in FIG. 4 (i.e., the layer within each triadic layer 132 first exposed to incident radiation). The third layer 132c includes more absorbent materials and is therefore the bottom layer within each triadic layer 132 as shown in FIG. 4 (i.e., the layer within each triadic layer 132 last exposed to incident radiation).

Figure 5:
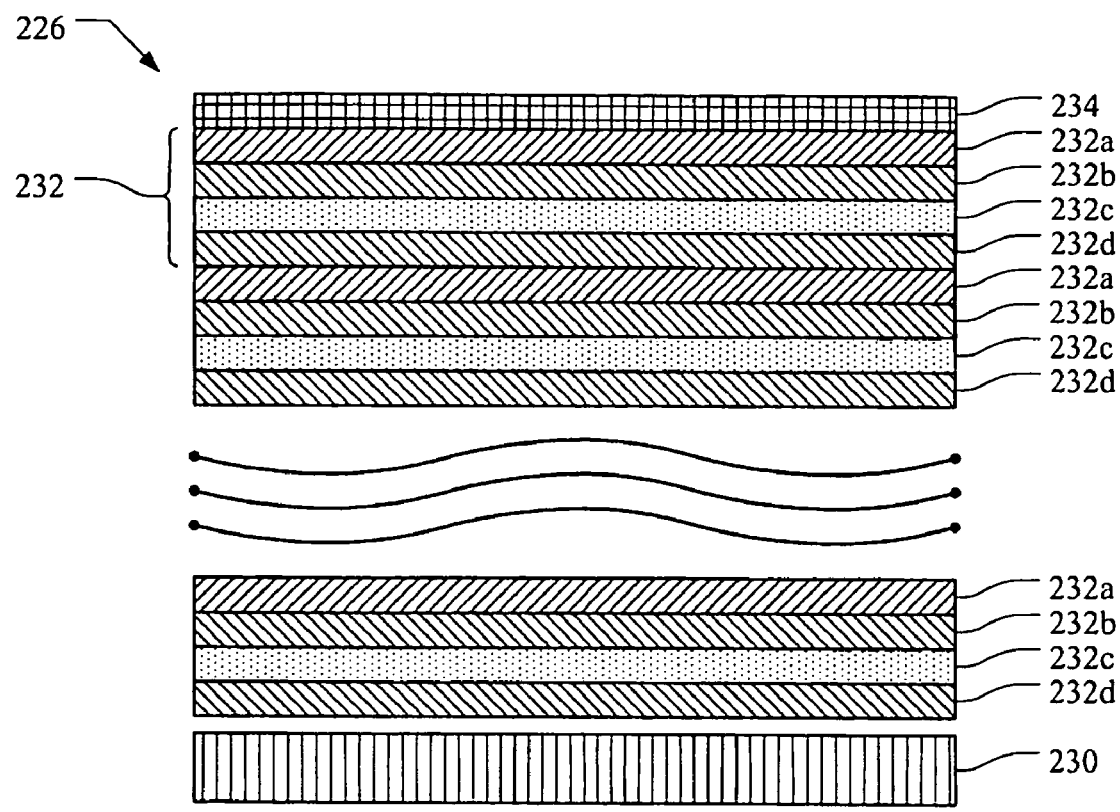
FIG. 5 is a schematic cross-sectional view of a multilayer structure in accordance with an embodiment of the present invention having a series of four individual layers.

In another embodiment illustrated in FIG. 5, a multilayer structure 226 may include a fourth layer, and thus a series of quartic layers 232 may be periodically formed upon a substrate 230. In this embodiment, each quartic layer 232 includes a quartet of layers 232a, 232b, 232c, 232d, which are sequentially deposited upon the substrate 230 to create the necessary periodicity. The multilayer structure 226 is composed of between around 10 and around 300 quartic layers 132, or between around 40 and around 1200 individual layers 232a, 232b, 232c, 232d. In a preferred embodiment, the multilayer structure 226 is composed of between around 50 and around 150 quartic layers 232, and each quartic layer 232 is between around 1 and around 60 nm in thickness, preferably between around 1.5 and around 10 nm in thickness. This thickness is otherwise referred to as the d-spacing of the multilayer structure 226 (as used in Equation (1)).

In this embodiment, the first layer 232a, second layer 232b, and third layer 232c are analogous to the first layer 132a, second layer 132b, and third layer 132c of the triadic multilayer structure 126. Thus, the layers 232a, 232b, and 232c are formed from the same materials as the layers 132a, 132b, and 132c, respectively, as described above with respect to the triadic multilayer structure 126. As illustrated in FIG. 5, the fourth layer 232d of the quartic layers 232 is composed of at least one of the materials listed for the second layer 132b described above with respect to the triadic multilayer structure 126.

In this embodiment, the second layer 232b and the fourth layer 232d may be chemically identical, although their respective geometrical characteristics may not be identical. In this embodiment, the second layer 232b is preferably disposed between the first layer 232a and the third layer 232c, and the third layer 232c is preferably disposed between the second layer 232b and the fourth layer 232d. Referring to FIG. 5, the first layer 232a is the top layer (i.e., the layer within each quartet first exposed to incident radiation) and the fourth layer 232d is the bottom layer (i.e., the layer within each quartet last exposed to incident radiation), such that the fourth layer is disposed between the third layer of multilayer period n and the first layer of multilayer period n−1.

It is a feature of the present invention that the multilayer structure may be shaped or otherwise tailored to maximize the performance of the system 10. For example, the multilayer structures 26, 126, 226 shown in FIGS. 3, 4, and 5 may be shaped into a conic section, such as an ellipsoid, paraboloid, or spheroid in order to regulate the magnitude of the angle of incidence θ at different points on the surface of the multilayer structures 26, 126, 226. By shaping the surface of the multilayer structures 26, 126, 226, the field of fluorescent radiation 14 can be conditioned in a particular manner such that the reflected field of fluorescent radiation 16 is focused upon the detector 28 in a preferred fashion.

The multilayer structures 26, 126, 226 preferably include a cap layer 34, 134, 234 on top of the first layer of the first period (i.e., top period) which acts as either a protective layer or an antireflective layer. For example, the cap layer 34, 134, 234 may be composed of silicon (Si), silicon carbide (SiC), silicon oxide ($SiO_2$), other oxide antireflective coatings, and any other suitable antireflective material known in the art.

Additionally, the d-spacing of the multilayer structures 26, 126, 226, shown in FIGS. 3, 4, and 5, i.e. the thickness of the bi-layer 32, triadic layer 132 or the quartic layer 232, may be varied along the depth of the multilayer structures 26, 126, 226, or alternatively, along a lateral axis of the multilayer structures 26, 126, 226. The latter manipulations are known as depth graded d-spacing and laterally graded d-spacing, respectively.

Different $Mg_2Si$-based multilayer analyzers were tested along with traditional prior art multilayer analyzers in the analysis of titanium nitride (TiN) thin films on a silicon (Si) wafer, the calculated performance of which is provided in Table 2 below and the energy-intensity distribution plots in FIGS. 6a-b.

Figure 6A:
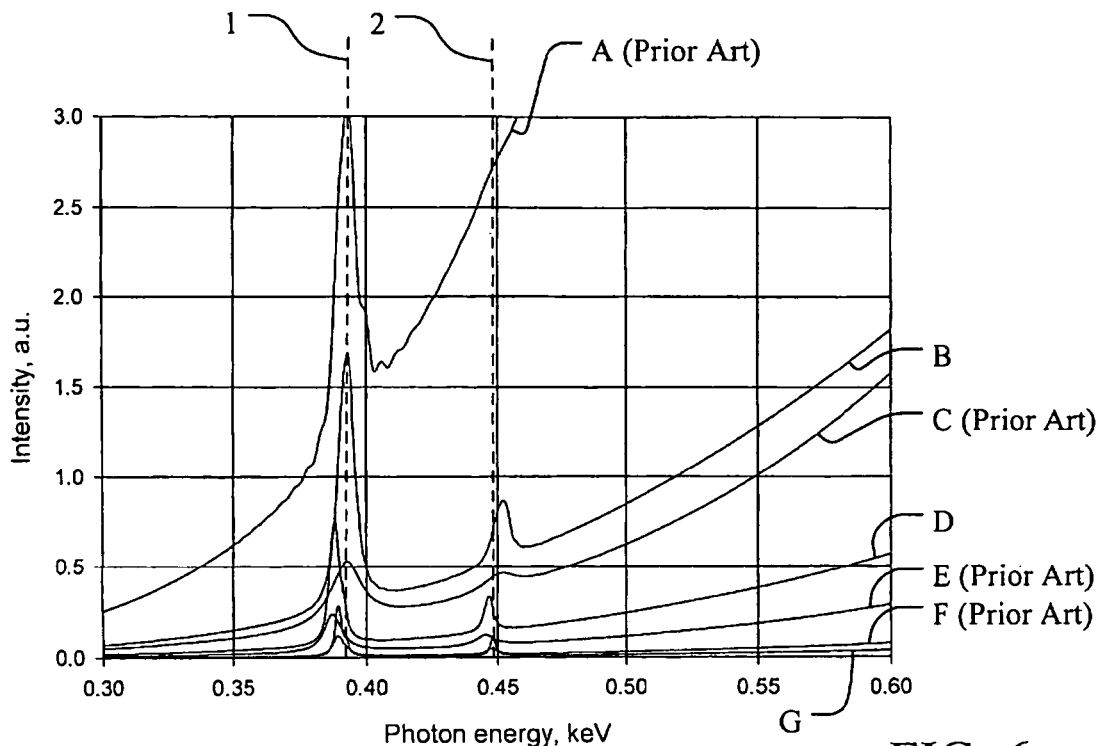
FIG. 6a is a plot showing an energy-intensity distribution of the performance of various multilayer analyzers during thin film analysis.
Figure 6B:
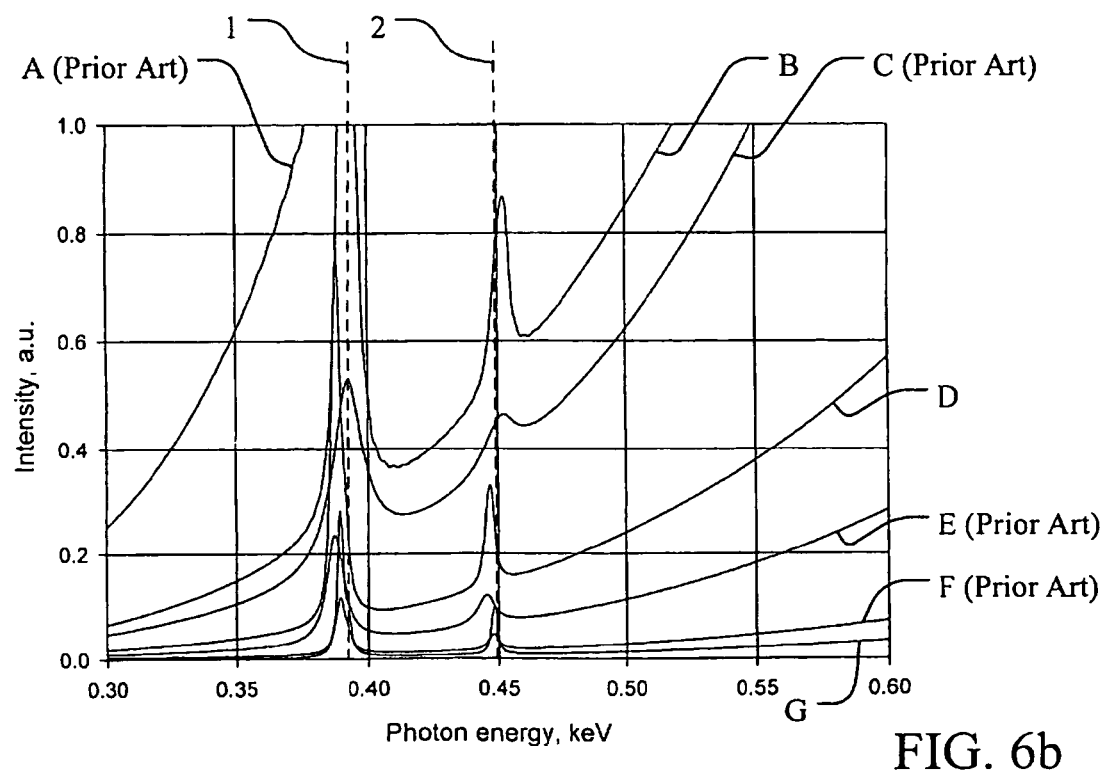

Referring to FIGS. 6a-b, a plot of the energy-intensity distribution of the calculated performance of various multilayer structures analyzing TiN thin films on a Si wafer is provided. As noted in Table 1, emission lines A, B, C, D, E, F, and G depict the performance of seven different multilayer structures Cr/Sc, Co/$Mg_2Si$, W/Si (OV080A), Ni/$Mg_2Si$, W/Si (OV060A), W/Si (OV045A), and SiC/$Mg_2Si$, respectively, each multilayer structure including a series of bi-layers. Lines A, C, E, and F represent multilayer structures known and used in the art and lines B, D, and G represent $Mg_2Si$-based multilayer structures in accordance with the embodiment illustrated in FIG. 3.

TABLE 1

| Emission Lines Depicted in FIGS. 6a-b | |
|---|---|
| Line A | Cr/Sc (prior art) |
| Line B | Co/$Mg_2Si$ |
| Line C | W/Si (OV080A; prior art) |
| Line D | Ni/$Mg_2Si$ |
| Line E | W/Si (OV060A; prior art) |
| Line F | W/Si (OV045A; prior art) |
| Line G | SiC/$Mg_2Si$ |
| Line 1 | N-$K_\alpha$ |
| Line 2 | Ti-$L_I$ |

Further noted in Table 1, a radiation line of nitrogen of the TiN thin films, known as the N—$K_\alpha$ line, is represented as line 1 and a radiation line of titanium of the TiN thin films, known as the Ti-$L_I$ line, is represented as line 2. The peaks along line 1 of each of the various multilayer structure emission lines represent the intensity reflected by each multilayer structure for the N of the TiN thin films. Likewise, the peaks along line 2 of each of the various multilayer structure emission lines represent the intensity reflected by each multilayer structure for the Ti of the TiN thin films.

Referring to FIGS. 6a-b, emission line A depicts the performance of a traditional multilayer structure known and used in the art including bi-layers of chromium/scandium (Cr/Sc). The specific product name of this particular tested multilayer analyzer, for which the calculated performance is charted in Table 2 below, is OV080E having a d-spacing of 4 nm. As illustrated in FIGS. 6a-b and Table 2, the peak of the Cr/Sc emission line (line A) situated along the N—$K_\alpha$ line (line 1) illustrates that the performance of the Cr/Sc multilayer structure results in a very high intensity (306.1 a.u.) for the analysis of the N of the TiN thin films. The Cr/Sc emission line (line A) however, does not display a peak along the Ti-$L_I$ line (line 2) which reveals that the Sc-based multilayer structure is incapable of analyzing the Ti of the TiN thin films (see Table 2, 0.0 a.u. for the Ti-$L_I$ line (line 2)). FIGS. 6a-b and Table 2 further illustrate that the Cr/Sc multilayer structure results in a very high background signal determined by the peak-to-background ratio (given in Table 2 as 2.35 for the N—$K_\alpha$ line (line 1)).

Emission line B depicts the performance of a $Mg_2Si$-based multilayer structure in accordance with the embodiment of FIG. 3 of the present invention including bi-layers of cobalt/magnesium silicide (Co/$Mg_2Si$), having a d-spacing of 4 nm. As shown in FIGS. 6a-b and Table 2 below, the peaks of the Co/$Mg_2Si$ emission line (line B) situated along the N—$K_\alpha$ line (line 1) and the Ti-$L_I$ line (line 2) illustrate not only that the Co/$Mg_2Si$ multilayer structure is capable of analyzing both the N and the Ti of the TiN thin films, but that the performance of the Co/$Mg_2Si$ multilayer structure results in a very high intensity for the analysis of both the N (169.4 a.u.) and the Ti (86.7 a.u.) of the TiN thin firms. In addition, FIGS. 6a-b and Table 2 further illustrate that the Co/$Mg_2Si$ multilayer structure results in a lower background signal than that of the prior art Cr/Sc multilayer structure (line A) determined by the peak-to-background ratio (given in Table 3 as 5.84 for the N—$K_\alpha$ line (line 1) and 1.61 for the Ti-$L_I$ line (line 2)).

Emission line C depicts the performance of a traditional multilayer structure known and used in the art including bi-layers of tungsten/silicide (W/Si). The specific product name of this particular tested multilayer analyzer, for which the calculated performance is charted in Table 2 below, is OV080A having a d-spacing of 4 nm. As shown in FIGS. 6a-b and Table 2, the peak of the W/Si emission line (line C) situated along the N—$K_\alpha$ line (line 1) illustrates that the performance of the W/Si (OV080A) multilayer structure results in a mid-range intensity (52.9 a.u.) for the group of analyzers in the analysis of the N of the TiN thin films. The peak of the W/Si emission line (line C) situated along the Ti-$L_I$ line (line 2) illustrates that the performance of the W/Si (OV080A) multilayer structure results in a mid-range intensity (46.4 a.u.) for the group of analyzers in the analysis of the Ti of the TiN thin films. FIGS. 6a-b and Table 2 further illustrate that the W/Si (OV080A) multilayer structure results in a very high background signal determined by the peak-to-background ratio (given in Table 2 as 2.52 for the N—$K_\alpha$ line (line 1) and 1.16 for the Ti-$L_I$ line (line 2)).

Emission line D depicts the performance of a $Mg_2Si$-based multilayer structure in accordance with the embodiment of FIG. 3 of the present invention including bi-layers of nickel/magnesium silicide ($Ni/Mg_2Si$), having a d-spacing of 3 nm. As shown in FIGS. 6a-b and Table 2 below, the peak of the $Ni/Mg_2Si$ emission line (line D) situated along the N—$K_\alpha$ line (line 1) illustrates that the performance of the $Ni/Mg_2Si$ multilayer structure results in a high intensity (75.2 a.u.) for the analysis of the N of the TiN thin films. The peak of the $Ni/Mg_2Si$ emission line (line D) situated along the Ti-$L_I$ line (line 2) illustrates that the performance of the $Ni/Mg_2Si$ multilayer structure results in a high intensity (32.9 a.u.) for the analysis of the Ti of the TiN thin films. FIGS. 6a-b and Table 2 further illustrate that the $Ni/Mg_2Si$ multilayer structure results in a much lower background signal determined by the peak-to-background ratio (given in Table 2 as 10.4 for the N—$K_\alpha$ line (line 1) and 2.3 for the Ti-$L_I$ line (line 2)).

Emission line E depicts the performance of a traditional multilayer structure known and used in the art including bi-layers of tungsten/silicide (W/Si). The specific product name of this particular multilayer analyzer, for which the calculated performance is charted in Table 2 below, is OV060A having a d-spacing of 3 nm. As shown in FIGS. 6a-b and Table 2, the peak of the W/Si emission line (line H) situated along the N—$K_\alpha$ line (line 1) illustrates that the performance of the W/Si (OV060A) multilayer structure results in a low intensity (23.6 a.u.) for the analysis of the N of the TiN thin films. The peak of the W/Si emission line (line H) situated along the Ti-$L_I$ line (line 2) illustrates that the performance of the W/Si (OV060A) multilayer structure results in a low intensity (12.2 a.u.) for the analysis of the Ti of the TiN thin films. FIGS. 6a-b and Table 2 further illustrate that the W/Si (OV060A) multilayer structure results in a mid-range background signal determined by the peak-to-background ratio (given in Table 2 as 6.6 for the N—$K_\alpha$ line (line 1) and 1.8 for the Ti-$L_I$ line (line 2)).

Emission line F depicts the performance of a traditional multilayer structure known and used in the art including bi-layers of tungsten/silicide (W/Si). The specific product name of this particular tested multilayer analyzer, for which the calculated performance is charted in Table 2 below, is OV045A having a d-spacing of 2.25 nm. As shown in FIGS. 6a-b and Table 2, the peak of the W/Si emission line (line F) situated along the N—$K_\alpha$ line (line 1) illustrates that the performance of the W/Si (OV045A) multilayer structure results in a very low intensity (11.74 a.u.) for the analysis of the N of the TiN thin films. The peak of the W/Si emission line (line F) situated along the Ti-$L_I$ line (line 2) illustrates that the performance of the W/Si (OV045A) multilayer structure results in a very low intensity (4.71 a.u.) for the analysis of the Ti of the TiN thin films. FIGS. 6a-b and Table 2 further illustrate that the W/Si (OV045A) multilayer structure results in a fairly low background signal determined by the peak-to-background ratio (given in Table 2 as 12.6 for the N—$K_\alpha$ line (line 1) and 2.7 for the Ti-$L_I$ line (line 2)).

Emission line G depicts the performance of a $Mg_2Si$-based multilayer structure in accordance with the embodiment of FIG. 3 of the present invention including bi-layers of silicon carbide/magnesium silicide ($SiC/Mg_2Si$), having a d-spacing of 3 nm. As shown in FIGS. 6a-b and Table 2 below, the peak of the $SiC/Mg_2Si$ emission line (line G) situated along the N—$K_\alpha$ line (line 1) illustrates that the performance of the $SiC/Mg_2Si$ multilayer structure results in a lower intensity (28.3 a.u.) than the other $Mg_2Si$-based multilayer structures and two of the prior art multilayer structures, but higher than the other two prior art multilayer structures for the analysis of the N of the TiN thin films. The peak of the $SiC/Mg_2Si$ emission line (line G) situated along the Ti-$L_I$ line (line 2) illustrates that the performance of the $SiC/Mg_2Si$ multilayer structure results in a low intensity (9.9 a.u.) for the analysis of the Ti of the TiN thin films. FIGS. 6a-b and Table 2 further illustrate that the $SiC/Mg_2Si$ multilayer structure results in a very low background signal determined by the peak-to-background ratio (given in Table 2 as 70.7 for the N—$K_\alpha$ line (line 1) and 12.4 for the Ti-$L_I$ line (line 2)).

In comparing the results of the various multilayer structures in the analysis of the N of the TiN thin films, the prior art Cr/Sc (OV080A) analyzer (line A) exhibits the highest intensity, followed by the two $Mg_2Si$-based analyzers, $Co/Mg_2Si$ and $Ni/Mg_2Si$ (lines B and D), followed by the prior art W/Si (OV080A) analyzer (line C), followed by the third $Mg_2Si$-based analyzer, $SiC/Mg_2Si$ (line G), followed by the last two prior art W/Si (OV060A and OV045A) analyzers (lines E and F) with the lowest intensities.

In comparing the results of the various multilayer structures in the analysis of the Ti of the TiN thin films, the $Co/Mg_2Si$ analyzer (line B) exhibits the highest intensity, followed by the prior art W/Si (OV080A) analyzer (line C), followed by the $Ni/Mg_2Si$ analyzer (line D), followed by the prior art W/Si (OV060A) analyzer (line E), followed by the $SiC/Mg_2Si$ analyzer (line G), followed by the prior art W/Si (OV045A) analyzer (line F), followed by the prior art Cr/Sc analyzer (line A), which is not capable of analyzing the Ti in the TiN thin films.

In comparing the results of the various multilayer structures in the background signal each exhibits, based on the peak-to-background ratio, the prior art Cr/Sc analyzer (line A) exhibits the highest background noise, followed by the prior art W/Si (OV080A) analyzer (line C), followed by the $Co/Mg_2Si$ analyzer (line B), followed by the prior art W/Si (OV060A) analyzer (line E), followed by the $Ni/Mg_2Si$ analyzer (line D), followed by the prior art W/Si (OV045A) analyzer (line F), and followed by the $SiC/Mg_2Si$ analyzer (line G) exhibiting the lowest background noise.

Although the prior art Cr/Sc analyzer (line A) exhibits the highest intensity in the analysis of N, it is not capable of analyzing Ti and exhibits the highest background noise and is therefore not a very desirable analyzer. While the prior art W/Si (OV080A) analyzer (line C) exhibits a higher intensity in the analysis of Ti, it is much poorer in the analysis of N and exhibits a very high background noise and is therefore not a very desirable analyzer. Both of the prior art W/Si (OV060A and OV045A) analyzers (lines E and F) are ranked near the middle in terms of the analysis of both N and Ti intensity and background noise.

From the results charted in Table 2 and plotted in FIGS. 6a-b, it is evidenced that the $Mg_2Si$-based analyzers, in accordance with the embodiment of FIG. 3, are more desirable analyzers than the prior art W/Si and Cr/Sc analyzers. For example, the $Ni/Mg_2Si$ analyzer (line D) exhibits a high intensity for both N and Ti and exhibits low background noise. The $SiC/Mg_2Si$ analyzer (line G) exhibits a lower intensity for both N and Ti, however, it exhibits the lowest background noise of all the analyzers. Lastly, although the $Co/Mg_2Si$ analyzer (line B) exhibits a higher background signal than the other $Mg_2Si$-based analyzers, it exhibits very high intensity in the analysis of both N and Ti, more than three times the intensity in the analysis of N and nearly twice the intensity in the analysis of Ti than that of the traditional prior art W/Si multilayers.

TABLE 2

| Analyzer | Intensity, a.u. | | Peak-to-Background Ratio | |
|---|---|---|---|---|
| | N-$K_\alpha$ | Ti-$L_I$ | N-$K_\alpha$ | Ti-$L_I$ |
| SiC/$Mg_2$Si | 28.3 | 9.9 | 70.7 | 12.4 |
| Ni/$Mg_2$Si | 75.2 | 32.9 | 10.4 | 2.3 |
| Co/$Mg_2$Si | 169.4 | 86.7 | 5.84 | 1.61 |
| W/Si (OV045A; prior art) | 11.74 | 4.71 | 12.6 | 2.7 |
| W/Si (OV060A; prior art) | 23.6 | 12.2 | 6.6 | 1.8 |
| Cr/Sc (OV080E; prior art) | 306.1 | 0.0 | 2.35 | 0.0 |
| W/Si (OV080A; prior art) | 52.9 | 46.4 | 2.52 | 1.16 |

Figure 7:
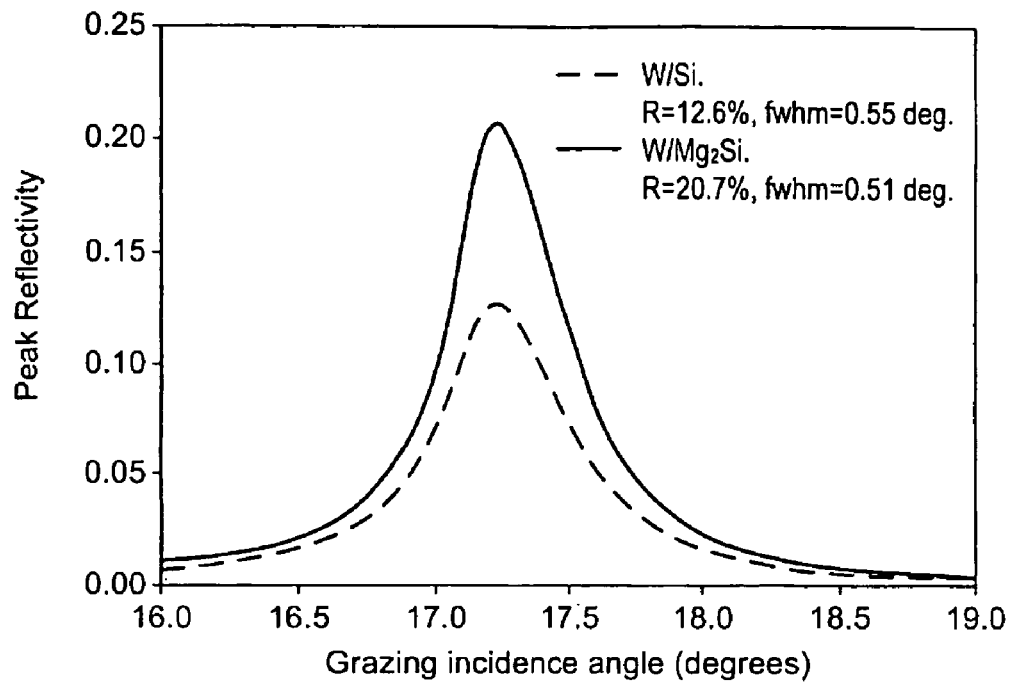
FIG. 7 is a plot showing the peak reflectivity of two different multilayer analyzers at the O—$K_\alpha$ radiation line plotted against the grazing incidence angle.

Referring now to FIG. 7, calculated angular reflectivity of a traditional prior art W/Si structure and a new W/$Mg_2$Si structure, in accordance with the embodiment of FIG. 3, at the O—$K_\alpha$ radiation line, is provided in the peak reflectivity-grazing incidence angle plot. The d-spacing of each structure is 4 nm and the number of bi-layers is 100. Gamma, i.e., the ratio of the thickness of the W layer to the d-spacing, is 0.3. Calculations were done assuming plane waves (i.e., no divergence), bulk material density of the layers, and interlayer roughness of 0.35 nm for W/Si and 0.4 nm for W/$Mg_2$Si structures. As shown in FIG. 7, a new bi-layer W/$Mg_2$Si multilayer shows a higher peak reflectivity (20.7%) and narrower FWHM (full width half maximum, 0.51 degrees) which promises better resolution as compared with the prior art bi-layer W/Si multilayer which shows a lower peak reflectivity (12.6%) and a wider FWHM (0.55 degrees).

Selectivity, or resolution, is dependent upon the number of layers within the multilayer structure through which the radiation penetrates, i.e., the more layers, the better the resolution. In other words, when radiation penetrates deeper, through more layers of a multilayer structure, this provides better resolution. This is where a W/$Mg_2$Si multilayer analyzer is limited. Because tungsten (W) absorbs radiation very effectively, the depth the radiation penetrates in a W/$Mg_2$Si bi-layer multilayer structure is limited due to the highly absorbent W layers. Radiation is thus absorbed closer to the surface resulting in a poorer resolution. Resolution can be improved by reducing the thickness of the W layer. This approach, however, typically results in a significant loss in peak reflectivity because W is associated with a high peak reflectivity. Accordingly, while FIG. 7 shows that the bi-layer W/$Mg_2$Si multilayer structure performs better than the prior art W/Si multilayer structure, the W/$Mg_2$Si analyzer is limited in resolution.

Alternatively, a SiC/$Mg_2$Si multilayer structure, for example, exhibits high resolution. In terms of the resolution of a particular multilayer structure, it is the average absorption of the layers within each period which come into play. Therefore, when comparing the resolution of a SiC/$Mg_2$Si multilayer structure with that of a W/$Mg_2$Si multilayer structure, since both structures include a layer of $Mg_2$Si within each period, the resolution of each structure can easily be compared by comparing W and SiC. Since SiC is lighter than highly absorbent W, radiation penetrates much deeper through a SiC/$Mg_2$Si multilayer structure than through a W/$Mg_2$Si multilayer structure, resulting in higher resolution for SiC/$Mg_2$Si multilayer analyzers.

In general, the thickness of each of the layers of a bi-layer multilayer structure, in accordance with FIG. 3, such as W/$Mg_2$Si or SiC/$Mg_2$Si multilayer structures, can be adjusted according to desirable reflectivity and selectivity parameters for specific applications. For example, multilayer structures with a relatively wide reflectivity curve provide better performance in WDS systems and multilayer structures with a narrower and higher reflectivity curve are better suited for EPMA (electron probe x-ray microanalysis) systems. However, due to the limitations of the optical constants of each of the layer materials, there is a compromise between reflectivity and selectivity when altering the thickness of the layers within a bi-layer multilayer structure. For instance, by reducing the thickness of the W layer of a W/$Mg_2$Si multilayer structure, selectivity may be improved by a factor of two; however, reflectivity is reduced by a factor of two as well.

In accordance with the embodiments of FIGS. 4-5, the introduction of a third layer, such as SiC, within the period of triadic layers 132 of a multilayer structure 126 having layers of W and $Mg_2$Si, or W within the period of triadic layers 132 of a multilayer structure 126 having layers of SiC and $Mg_2$Si, helps to overcome the limitations of the bi-layer multilayer structures 26 in accordance with FIG. 3. The compromise between peak reflectivity and selectivity is solved by combining, for example, W, SiC, and $Mg_2$Si into a three-layer, or triadic, W/SiC/$Mg_2$Si multilayer structure 126, in accordance with FIG. 4.

In this embodiment, the third layer is introduced not as a barrier layer, but for the capability to optimize parameters for a particular application. For example, the relative thickness of the different layers 132a, 132b, 132c within the triadic layers 132 may be modified in order to optimize parameters for particular applications For example, with a multilayer structure 126 such as W/SiC/$Mg_2$Si, where it is known that W is associated with a lower resolution, and that SiC is associated with a higher resolution, it is possible to tailor the multilayer structure 126 to suit a particular application by varying the ratio of thickness between the W and the SiC layers. Thus, to provide a triadic multilayer structure 126 with optimal flux, which is desirable for applications using conventional spectrometers where the divergence of the x-ray beam is relatively high, the layers 132c comprising W should be thicker than the layers 132b comprising SiC. Alternatively, to provide a triadic multilayer structure 126 with optimal resolution, which is desirable for applications using fixed-channel spectrometers, where there is very small or no divergence of the x-ray beam, the layers 132b comprising SiC should be thicker than the layers 132c comprising W.

Figure 8:
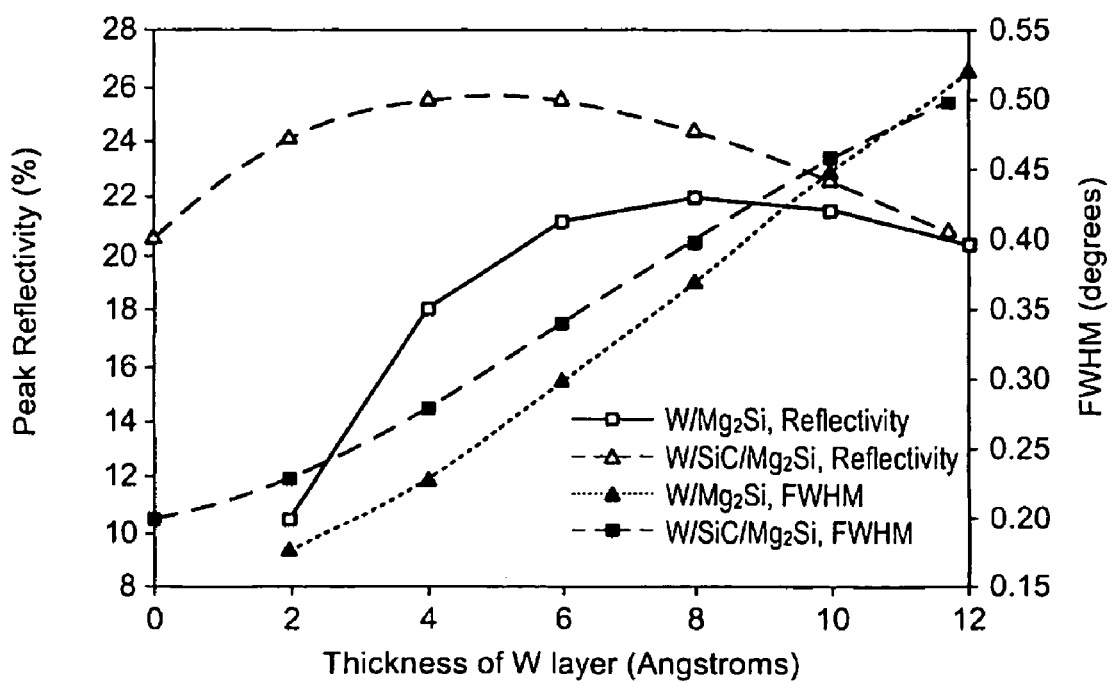
FIG. 8 is a plot showing the peak reflectivity and the FWHM of two different multilayer analyzers as the thickness of one of the layers changes.

Further evidence illustrating the improved performance of a tri-layer multilayer structure 126, in accordance with FIG. 4, over a bi-layer multilayer structure 26, in accordance with FIG. 3, is provided in FIG. 8. FIG. 8 compares the calculated performance, at the O—$K_\alpha$ radiation line, of a bi-layer W/$Mg_2$Si multilayer structure 26 and a tri-layer W/SiC/$Mg_2$Si multilayer structure 126 as a function of the thickness of the W layer of each particular multilayer structure. For these calculations, the thickness of the $Mg_2$Si layer in the tri-layer structure was maintained constant at 2.89 nm and both structures have a d-spacing of 4.06 nm.

Referring to FIG. 8, the effect that varying the thickness of the layers has on the selectivity (i.e., resolution) and reflectivity is evident from the FWHM lines and the Reflectivity lines, respectively. The difference between the FWHM lines for the W/SiC/$Mg_2$Si and W/$Mg_2$Si multilayer structures is not very significant, both lines indicating that as the thickness of the W layer increases, the FWHM increases (i.e., the FWHM peak becomes wider), and thus the resolution decreases. The difference between the reflectivity lines for the W/SiC/Mg$_2$Si and W/Mg$_2$Si multilayer structures is much more significant and shows that the tri-layer W/SiC/Mg$_2$Si multilayer structure has a much better reflectivity than the bi-layer W/Mg$_2$Si multilayer structure. For example, when the W layer is 2 Angstroms (0.2 nm), the W/SiC/Mg$_2$Si multilayer structure exhibits more than two times the reflectivity of the bi-layer W/Mg$_2$Si multilayer structure. As the thickness of the W layer increases, the difference in reflectivity between the two structures is not as great; however, it is significant enough to see that the tri-layer W/SiC/Mg$_2$Si multilayer structure performs better than the bi-layer multilayer structure.

As illustrated in FIG. 8, improvement of selectivity by a factor of two results in a mere 15% reflectivity loss with a tri-layer structure versus a 50% reflectivity loss with a bi-layer structure. Reflectivity of the multilayer structure depends not only on layer materials and thickness, but also on the order of the layers in the structure. For instance, reflectivity of a W/SiC/Mg$_2$Si multilayer structure is higher than that of a W/Mg$_2$Si/SiC with similar layer thickness and imperfections.

Figure 9:
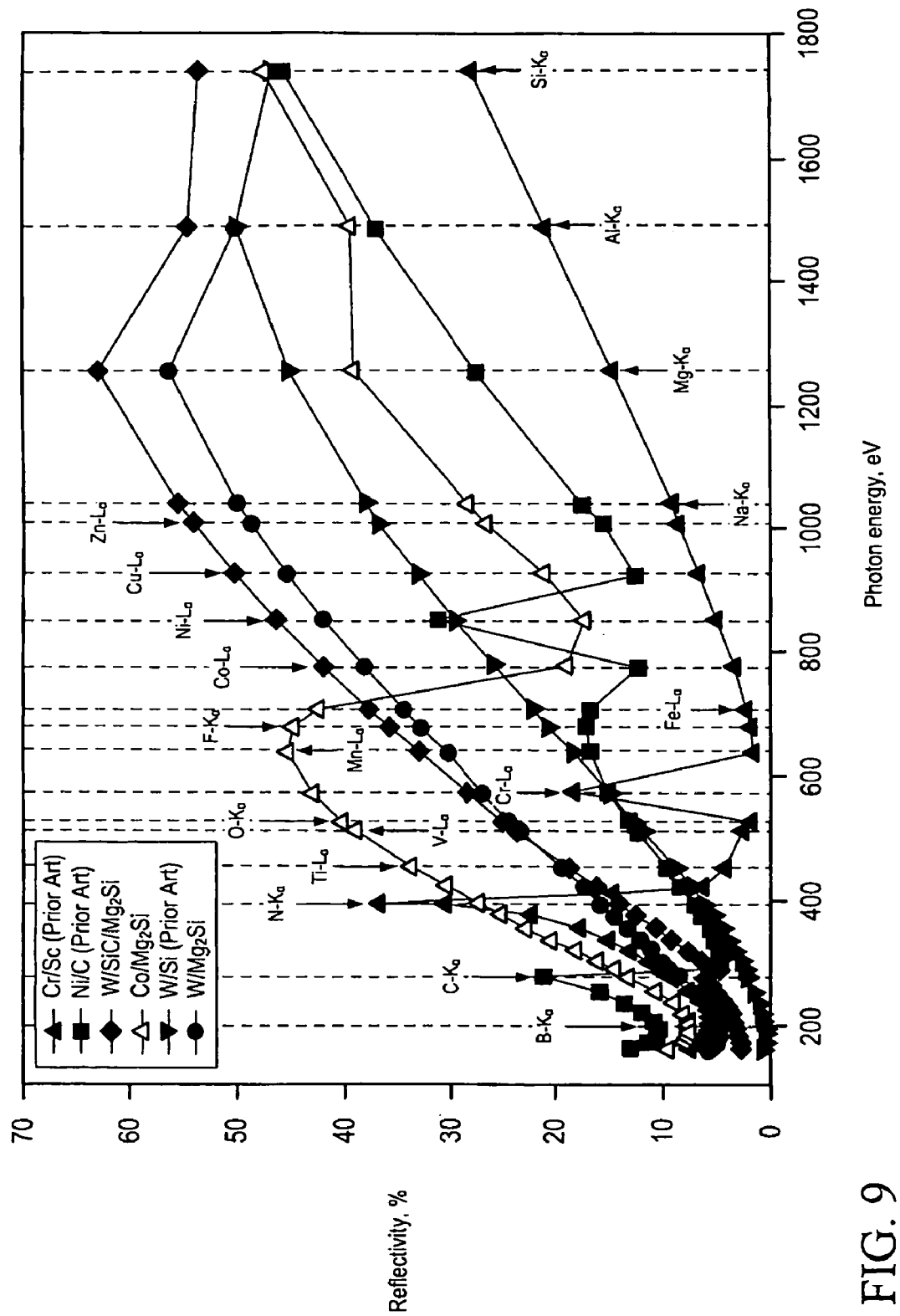
FIG. 9 is a plot showing an energy-reflectivity distribution of the performance of various multilayer analyzers during x-ray fluorescence analysis.

FIG. 9 shows a plot of the expected reflectivity of Mg$_2$Si-based structures compared with prior art multilayer structures in the analysis of TiN thin films on a Si wafer in the photon energy range of 170 eV to 1750 eV. Referring to FIG. 9, emission lines are depicted for the performance of six different multilayer structures, including five multilayer structures having a series of bi-layers and one multilayer structure having a series of triadic layers. The analyzers having a series of bi-layers include prior art analyzers Cr/Sc (OV080E; d=4 nm), Ni/C (OV080N; d=4 nm), and W/Si (OV080A; d=4 nm), and Mg$_2$Si-based analyzers, Co/Mg$_2$Si (d=4 nm) and W/Mg$_2$Si (d=4 nm), in accordance with the embodiment of FIG. 3 of the present invention. The analyzer having a series of triadic layers in accordance with the embodiment of FIG. 4 of the present invention, the performance of which is plotted in FIG. 9, is the W/SiC/Mg$_2$Si analyzer, having a d-spacing of 4 nm. Each emission line is associated with its own symbol provided in the key in FIG. 9.

FIG. 9 shows the energy-reflectivity distribution of the various multilayer structures analyzing various elements boron (B), carbon (C), nitrogen (N), titanium (Ti), vanadium (V), oxygen (O), chromium (Cr), manganese (Mn), fluorine (F), iron (Fe), cobalt (Co), nickel (Ni), copper (Cu), zinc (Zn), sodium (Na), magnesium (Mg), aluminum (Al), and silicon (Si). The reflectivity reflected by each analyzer for each particular element is denoted along the radiation line associated with each element as noted in Table 3 below.

TABLE 3

| Element | Emission Line |
| --- | --- |
| B | B-K$_\alpha$ |
| C | C-K$_\alpha$ |
| N | N-K$_\alpha$ |
| Ti | Ti-L$_\alpha$ |
| V | V-L$_\alpha$ |
| O | O-K$_\alpha$ |
| Cr | Cr-L$_\alpha$ |
| Mn | Mn-L$_\alpha$ |
| F | F-K$_\alpha$ |
| Fe | Fe-L$_\alpha$ |
| Co | Co-L$_\alpha$ |
| Ni | Ni-L$_\alpha$ |
| Cu | Cu-L$_\alpha$ |
| Zn | Zn-L$_\alpha$ |
| Na | Na-K$_\alpha$ |
| Mg | Mg-K$_\alpha$ |
| Al | Al-K$_\alpha$ |
| Si | Si-K$_\alpha$ |

As evidenced in FIG. 9, for energies above about 700 eV, the reflectivity of new tri-layer W/SiC/Mg$_2$Si and bi-layer W/Mg$_2$Si structures exceeds the reflectivity of the prior art W/Si multilayer structures in this range. At lower energies, another new bi-layer Co/Mg$_2$Si structure promises the best reflectivity and resolution. As described previously with respect to FIGS. 3-5, transition metals such as nickel (Ni), copper (Cu), iron (Fe), chromium (Cr), and alloys, oxides, borides, silicides, and nitrides of these elements, and other materials having optimal optical properties can be used in place of cobalt (Co) as one of the layer materials. Thus, FIG. 9 illustrates that the Mg$_2$Si-based multilayer analyzers over-perform the traditional prior art multilayer analyzers for nearly all elements under analysis, at some points exhibiting two times more reflectivity than the other multilayer structures. An exception is at the N—K$_\alpha$ line, where Sc-based multilayers perform the best. However, as provided above, Sc-based analyzers, such as Cr/Sc and Fe/Sc, have the disadvantages of relatively low resolution and a high-background signal from the Si-L$_\alpha$ line when analyzing thin films on silicon wafers.

As illustrated in FIG. 9, the triadic W/SiC/Mg$_2$Si multilayer structure exhibits the highest reflectivity for most elements, and hence further evidences the enhanced performance of the Mg$_2$Si-based triadic multilayer structure. With a triadic multilayer structure 126, the compromise between parameters is not as significant. Accordingly, while a Mg$_2$Si-based bi-layer multilayer structure 26, in accordance with FIG. 3, provides a single analyzer for analyzing TiN thin films and which has improved performance over a number of prior art multilayer structures, a triadic multilayer structure 126, in accordance with FIG. 4, provides the ability to optimize a wide range of parameters without greatly sacrificing other parameters. Thus, the advantages of a triadic multilayer structure 126 comprising a Mg$_2$Si-based layer 132*a*, a light layer 132*b*, such as SiC, and an absorbent layer 132*c*, such as W, include increased peak reflectivity, increased selectivity, and a reduced background signal, which is determined by the peak-to-background ratio.

Further tests and analyses of Mg$_2$Si-based multilayer structures were performed, the results of which are discussed below, and shown in Tables 4-7. In the deposition process used for depositing the material layers of the tested multilayer structures, the substrate was first mounted on the facet of a rotating carousel which passes in front of the magnetron sputtering sources to form an alternating structure. The diameter and height of the deposition chamber were 600 mm and 540 mm, respectively. The desired thickness of the coating for each material was obtained through the control of the rotational period of the carousel. The deposition system included three magnetron sputtering cathodes and one ion-beam source used for substrate cleaning prior to deposition. Targets used for deposition of Mg$_2$Si-based structures had a rectangular shape with the length of about 200 mm and width of about 90 mm.

Reflectivity and analytical performance in the soft x-ray range were examined by a Rigaku wavelength dispersive fluorescent spectrometer with a standard measurement condition. All soft x-ray measurements were done in comparison with existing prior art W/Si analyzers.

Three different sets of multilayers were deposited on substrates and tested. The first set contained W/SiC/Mg$_2$Si multilayer structures with a d-spacing of about 4 nm (2d equal to about 8 nm). The second set included the same structure but with a d-spacing of about 2.25 nm (2d equal to about 5.5 nm). The final set comprised Co/Mg$_2$Si multilayer structures with a d-spacing of about 4 nm (2d equal to about 8 nm). Each of the first two sets contained one structure with a larger thickness of W layer. Such structures typically provided higher flux and are herein referred to as High-Flux structures. Structures with the smallest thickness of W layer showed the narrowest peak width and are herein referred to as High-Resolution structures. Structures with a W layer thickness in between the High-Flux structures and the High-Resolution structures are herein referred to as Average Flux.

Performance gain (i.e., intensity or resolution gain) of the new structures was calculated as follows: Performance gain is equal to performance of Mg2Si-based structures/performance of W/Si structures. Tables 4 and 5 below provide test results of the performance comparison between new and W/Si structures. Table 4 shows the performance gain of High-Flux, Average Flux, and High Resolution W/SiC/Mg$_2$Si multilayer structures. Table 5 shows the performance gain of only High Flux Co/Mg$_2$Si multilayer structures having a d-spacing of about 4 nm (2d equal to about 8 nm).

TABLE 5

| Line | Energy, eV | Sample | Performance Gain Intensity | Performance Gain Resolution |
|---|---|---|---|---|
| N-K$_\alpha$ | 392 | Si$_3$N$_4$ | 1.57 | 0.75 |
| O-K$_\alpha$ | 525 | SiO$_2$ | 1.37 | 0.65 |
| F-K$_\alpha$ | 678 | LiF | 0.63 | 0.67 |
| Na-K$_\alpha$ | 1040 | NaCl | 0.47 | 1.00 |
| Mg-K$_\alpha$ | 1254 | Metal | 0.61 | 1.05 |

As showed in Table 5, High Flux Co/Mg$_2$Si structures demonstrated 37-57% flux gain at N—K$_\alpha$ and O—K$_\alpha$ in spite of a much narrower reflectivity curve, indicating high peak reflectivity for these structures. Performance of Co/Mg$_2$Si multilayers at F—K$_\alpha$ is much lower than expected, which can be partially explained by the relatively large divergence of the solar slit used for the measurements. An even better performance can be expected for EPMA systems.

Analytical performance of the multilayer analyzers was tested by measuring intensity of fluorescent radiation from samples having different concentrations of the analyzed element. Typically, the intensity linearly depends on concentration. Inclination of the line characterizes sensitivity of an analyzer. Intensity at a concentration equal to zero is called

TABLE 4

| 2d, nm | Line | Energy, eV | Sample | High Flux Performance Gain | | Average Flux Performance Gain | | High Resolution Performance Gain | |
|---|---|---|---|---|---|---|---|---|---|
| | | | | Intensity | Resolution | Intensity | Resolution | Intensity | Resolution |
| 8 | N-K$_\alpha$ | 392 | Si$_3$N$_4$ | 1.54 | 0.91 | 1.43 | 0.83 | 0.98 | 0.8 |
| | O-K$_\alpha$ | 525 | SiO$_2$ | 1.36 | 0.97 | 1.42 | 0.84 | 1.05 | 0.73 |
| 5.5 | O-K$_\alpha$ | 525 | SiO$_2$ | 1.34 | 0.92 | | | 0.95 | 0.8 |
| | F-K$_\alpha$ | 678 | LiF | 1.17 | 0.95 | | | 0.86 | 0.83 |
| | Na-K$_\alpha$ | 1040 | NaCl | 1.14 | 0.97 | | | 0.8 | 0.88 |
| | Mg-K$_\alpha$ | 1254 | Metal | 1.12 | 0.98 | | | 0.78 | 0.92 |

As illustrated in Table 4, all High Flux W/SiC/Mg$_2$Si structures showed a flux gain from 12% at Mg—K$_\alpha$ to 54% at N—K$_\alpha$. Such tendency, larger flux gain at longer wavelengths, is in good agreement with the calculations plotted in FIG. 9. Lower than expected gain values can be explained by the relatively large divergence of the radiation coming out of a solar slit convoluted with the higher resolution of the new analyzers in comparison with W/Si structures. This phenomenon also explains the lower flux gain from the High-Resolution structures. Experiments done with a wider solar slit, which provides an even more divergent beam, showed a lower flux gain in comparison with data from the previously used narrower solar slit.

Background Equivalent Coefficient (B.E.C.) which characterizes the degree of background intensity. Further, from an equation describing the linear dependence, Lower Limit of Detection (L.L.D.) can be determined. A larger value of the sensitivity, a smaller value of the B.E.C., and a smaller value of the L.L.D. indicate an improvement in analyzer performance. These three major characteristics of tested W/SiC/Mg$_2$Si analyzers are presented in Table 6 below. The values provided in Table 6 represent a ratio between the value of a particular parameter for the new W/SiC/Mg$_2$Si structures and a corresponding value for the traditional prior art W/Si analyzer.

TABLE 6

| 2d, nm | Line | Sample | High Flux | | | High Resolution | | |
|---|---|---|---|---|---|---|---|---|
| | | | L.L.D. | Sensitivity | B.E.C. | L.L.D. | Sensitivity | B.E.C. |
| 8 | N-K$_\alpha$ | TiN film | 0.88 | 1.39 | 1.08 | 1.12 | 0.85 | 1.07 |
| | O-K$_\alpha$ | AlO film | 0.86 | 1.34 | 0.99 | 0.97 | 1.02 | 0.96 |
| 5.5 | O-K$_\alpha$ | AlO film | 0.87 | 1.33 | 1.00 | 1.01 | 0.97 | 0.98 |
| | F-K$_\alpha$ | Polymer | 0.83 | 1.21 | 0.84 | 0.92 | 0.90 | 0.77 |
| | Na-K$_\alpha$ | Polymer | 0.93 | 1.10 | 0.95 | 1.11 | 0.81 | 0.98 |
| | Mg-K$_\alpha$ | Polymer | 0.89 | 1.09 | 0.86 | 1.06 | 0.80 | 0.90 |

TABLE 6-continued

| 2d, nm | Line | Sample | High Flux | | | High Resolution | | |
|---|---|---|---|---|---|---|---|---|
| | | | L.L.D. | Sensitivity | B.E.C. | L.L.D. | Sensitivity | B.E.C. |
| | Mg-K$_\alpha$ | MgO film | 0.94 | 1.14 | 0.92 | 1.08 | 0.78 | 0.76 |
| | Mg-K$_\alpha$ | Cast Iron | 0.93 | 1.10 | 0.95 | 1.09 | 0.81 | 0.95 |

As shown in Table 6, the High-Flux W/SiC/Mg$_2$Si structures showed about 10-40% improvement in sensitivity and slight improvement in B.E.C. Further, L.L.D. is improved about 10% in comparison with the traditional prior art analyzer. The High-Resolution structures did not show significant improvement due to mainly its poor sensitivity.

While multilayer structures having alternating layers of two different materials are known in the art, for example the prior art W/Si multilayer structures discussed and evaluated above, a Mg$_2$Si-based multilayer analyzer provides an improved multilayer structure capable of analyzing both Ti and N in TiN thin films as well as more efficiently analyzing elements such as F and O (see FIG. 9). Further, in view of the highly reactive properties of pure Mg in Mg-based multilayer structures, such as W/Mg, Mg$_2$Si is a more stable layer material and has proven to provide a very desirable layer material for XRF multilayer analyzers, such as Co/Mg$_2$Si, W/Mg$_2$Si, SiC/Mg$_2$Si, W/SiC/Mg$_2$Si, or any other layer combination disclosed herein.

Moreover, the testing results provided above in Tables 2 and 4-6, and in FIGS. 6-9, evidence that Mg$_2$Si-based multilayer structures containing two, three or more different layer materials in a single period provide an improved multilayer structure in the analysis of light elements from magnesium to nitrogen. The additional third, fourth, or more layers are provided for improving the overall performance of the analyzer as well as for performance flexibility depending on a particular application.

It should be apparent to those skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

The invention claimed is:

1. A multilayer structure for reflecting x-rays comprising: a substrate having formed on a surface thereof at least one period of individual layers, wherein the at least one period includes at least three individual layers including a first layer, a second layer, and a third layer, wherein the first layer includes magnesium silicide (Mg$_2$Si), the second layer includes at least one of silicon (Si), carbon (C), silicon carbide (SiC), boron (B), and boron carbide (B$_4$C), and the third layer includes at least one of tungsten (W), tantalum (Ta), cobalt (Co), nickel (Ni), copper (Cu), iron (Fe), chromium (Cr), and alloys, oxides, borides, silicides, and nitrides of these elements.

2. The multilayer structure of claim 1 wherein the second layer is disposed between the first layer and the third layer, wherein the second layer includes silicon carbide (SiC) and the third layer includes tungsten (W).

3. The multilayer structure of claim 1 wherein the at least one period includes a fourth layer, wherein the fourth layer includes at least one of silicon (Si), carbon (C), silicon carbide (SiC), boron (B), and boron carbide (B$_4$C), wherein the second layer is disposed between the first layer and the third layer, wherein the third layer is disposed between the second layer and the fourth layer.

4. The multilayer structure of claim 1 wherein the individual layers within the at least one period have the same thickness.

5. The multilayer structure of claim 1 wherein the individual layers within the at least one period have different thicknesses.

6. The multilayer structure of claim 1 wherein the structure includes at least 10 of the periods.

7. The multilayer structure of claim 1 wherein the structure includes at least 50 of the periods.

8. The multilayer structure of claim 1 wherein the at least one period is between 1 and 60 nanometers in thickness.

9. The multilayer structure of claim 1 wherein the at least one period is between 1.5 and 10 nanometers in thickness.

10. The multilayer structure of claim 1 wherein the first layer of the at least one period is configured to be exposed to x-ray radiation before the second and third layers of the same period.

11. The multilayer structure of claim 1 wherein the at least one period includes a top period configured to be exposed to x-ray radiation before any other period, wherein the top period includes a cap layer, the cap layer configured to be exposed to radiation before any other layer, wherein the cap layer includes one of silicon (Si), silicon carbide (SiC), silicon oxide (SiO$_2$), and any other antireflective oxide.

12. The multilayer structure of claim 11 wherein the cap layer includes more than one layer of materials.

13. An x-ray fluorescence spectroscopy system comprising:
an x-ray source emitting an x-ray radiation field on a sample; and
a multilayer structure including a substrate having formed on a surface thereof at least one period of individual layers, wherein the at least one period includes at least three individual layers including a first layer, a second layer, and a third layer, wherein the first layer includes magnesium silicide (Mg$_2$Si), the second layer includes at least one of silicon (Si), carbon (C), silicon carbide (SiC), boron (B), and boron carbide (B$_4$C), and the third layer includes at least one of tungsten (W), tantalum (Ta), cobalt (Co), nickel (Ni), copper (Cu), iron (Fe), chromium (Cr), and alloys, oxides, borides, silicides, and nitrides of these elements, wherein the sample emits a fluorescent radiation field in response to the x-ray radiation field, and wherein the multilayer structure selectively reflects the fluorescent radiation field.

14. The system of claim 13 wherein the first layer of the at least one period is exposed to the radiation before the second and third layers of the same period.

15. The system of claim 13 wherein the at least one period includes a fourth layer, wherein the fourth layer includes at least one of silicon (Si), carbon (C), silicon carbide (SiC), boron (B), and boron carbide (B$_4$C), wherein the second layer is disposed between the first layer and the third layer, wherein the third layer is disposed between the second layer and the fourth layer.

16. The system of claim 13 wherein the at least one period includes a top period exposed to the radiation before any other period, wherein the top period includes a cap layer, the cap layer exposed to the radiation before any other layer, wherein the cap layer includes one of silicon (Si), silicon carbide (SiC), silicon oxide ($SiO_2$), and any other antireflective oxide.

17. The system of claim 16 wherein the cap layer includes more than one layer of materials.

18. The system of claim 13 wherein the individual layers within the at least one period have the same thickness.

19. The system of claim 13 wherein the individual layers within the at least one period have different thicknesses.

20. The system of claim 13 wherein the multilayer structure includes at least 10 of the periods.

21. The system of claim 13 wherein the multilayer structure includes at least 50 of the periods.

22. The system of claim 13 wherein the at least one period is between 1 and 60 nanometers in thickness.

23. The system of claim 13 wherein the at least one period is between 1.5 and 10 nanometers in thickness.

24. The system of claim 13 wherein the second layer is disposed between the first layer and the third layer, wherein the second layer includes silicon carbide (SiC) and the third layer includes tungsten (W).

25. A method of x-ray fluorescence spectroscopy comprising:
   providing a field of x-ray radiation;
   irradiating a sample to be analyzed with the field of x-ray radiation, thereby inducing a field of fluorescence radiation;
   directing the field of fluorescence radiation from a multilayer reflector including a substrate having formed on a surface thereof at least one period of individual layers, wherein the at least one period includes at least three individual layers including a first layer, a second layer, and a third layer, wherein the first layer includes magnesium silicide ($Mg_2Si$), the second layer includes at least one of silicon (Si), carbon (C), silicon carbide (SiC), boron (B), and boron carbide ($B_4C$), and the third layer includes at least one of tungsten (W), tantalum (Ta), cobalt (Co), nickel (Ni), copper (Cu), iron (Fe), chromium (Cr), and alloys, oxides, borides, silicides, and nitrides of these elements; and
   analyzing the field of fluorescence radiation emitted by the sample.

26. The method of claim 25 wherein the second layer is disposed between the first layer and the third layer, wherein the second layer includes silicon carbide (SiC) and the third layer includes tungsten (W).

* * * * *